US010198512B2

(12) United States Patent
Makhani et al.

(10) Patent No.: US 10,198,512 B2
(45) Date of Patent: Feb. 5, 2019

(54) SEARCH RELEVANCE USING PAST SEARCHERS' REPUTATION

(71) Applicant: Microsoft Technology Licensing, LLC, Redmond, WA (US)

(72) Inventors: Asif Mansoor Ali Makhani, Fremont, CA (US); Shakti Dhirendraji Sinha, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 228 days.

(21) Appl. No.: 14/822,690

(22) Filed: Aug. 10, 2015

(65) Prior Publication Data

US 2016/0378865 A1 Dec. 29, 2016

Related U.S. Application Data

(60) Provisional application No. 62/186,271, filed on Jun. 29, 2015.

(51) Int. Cl.
G06F 17/30 (2006.01)
G06Q 50/00 (2012.01)

(52) U.S. Cl.
CPC .... G06F 17/30864 (2013.01); G06F 17/3053 (2013.01); G06F 17/30457 (2013.01); G06Q 50/01 (2013.01)

(58) Field of Classification Search
CPC combination set(s) only.
See application file for complete search history.

(56) References Cited

U.S. PATENT DOCUMENTS 7,194,458 B1 * 3/2007 Micaelian ........... G06F 17/3053
707/706
8,812,690 B1 8/2014 Ramesh et al.
2006/0100919 A1 * 5/2006 Levine ................ G06Q 10/04
379/88.21

(Continued)

FOREIGN PATENT DOCUMENTS

CA 2856645 A1 6/2009

OTHER PUBLICATIONS

"International Application Serial No. PCT/US2016/039064, International Search Report dated Sep. 28, 2016", 3 pgs.

(Continued)

Primary Examiner — Etienne P Leroux
(74) Attorney, Agent, or Firm — Schwegman Lundberg & Woessner, P.A.

(57) ABSTRACT

Techniques for improving search relevance using past searchers' reputation are described. According to various embodiments, a specification of a search query term corresponding to a skill is received from a searcher, in connection with a search for members of an online social networking service having the skill. Thereafter, a list of search results is generated and displayed based on the search query term, each of the search results corresponding to a member of the online social networking service. A subsequent interaction between the searcher and a specific member corresponding to one of the search results is detected. A skill reputation score associated with the searcher and the skill is then accessed. Thereafter, a search relevance score associated with the specific member and the skill is modified based on the skill reputation score associated with the searcher and the skill.

15 Claims, 7 Drawing Sheets

(56) References Cited

U.S. PATENT DOCUMENTS

| | | | | |
|---|---|---|---|---|
| 2008/0140430 A1* | 6/2008 | Hyder | ................... | G06Q 30/00 |
| | | | | 705/1.1 |
| 2011/0275442 A1* | 11/2011 | Hawkins, III | .......... | A63F 13/30 |
| | | | | 463/42 |
| 2013/0282605 A1* | 10/2013 | Noelting | ............ | G06Q 10/1053 |
| | | | | 705/321 |
| 2013/0297589 A1* | 11/2013 | Work | ..................... | G06Q 10/00 |
| | | | | 707/722 |
| 2014/0025673 A1 | 1/2014 | Sinha et al. | | |
| 2014/0214881 A1* | 7/2014 | Braham | ............ | G06F 17/30424 |
| | | | | 707/769 |
| 2014/0278633 A1* | 9/2014 | Daly | .............. | G06Q 10/063112 |
| | | | | 705/7.14 |

OTHER PUBLICATIONS

"International Application Serial No. PCT/US2016/039064, Written Opinion dated Sep. 28, 2010", 4 pgs.

\* cited by examiner

| RELATED SKILLS INFORMATION | |
|---|---|
| Skill Cluster 1 | Skill A<br>Skill B<br>Skill C<br>⋮ |
| Skill Cluster 2 | Skill A<br>Skill B<br>Skill C<br>⋮ |
| Skill Cluster 2 | Skill A<br>Skill B<br>Skill C<br>⋮ |

*FIG. 5*

SEARCH RELEVANCE USING PAST SEARCHERS' REPUTATION

RELATED APPLICATION

This application claims the priority benefit of U.S. Provisional Application No. 62/186,271, filed Jun. 29, 2015, the content of which is incorporated by reference herein in its entirety.

TECHNICAL FIELD

The present application relates generally to data processing systems and, in one specific example, to techniques for improving search relevance using past searchers' reputation.

BACKGROUND

Online social network services such as LinkedIn® are becoming increasingly popular, with many such websites boasting millions of active members. Each member of the online social network service is able to upload an editable member profile page to the online social network service. The member profile page may include various information about the member, such as the member's biographical information, photographs of the member, and information describing the member's employment history, education history, skills, experience, activities, and the like. Such member profile pages of the networking website are viewable by, for example, other members of the online social network service.

BRIEF DESCRIPTION OF THE DRAWINGS

Some embodiments are illustrated by way of example and not limitation in the figures of the accompanying drawings in which:

FIG. 5 illustrates related skill information, according to various embodiments;

DETAILED DESCRIPTION

Example methods and systems for improving search relevance using past searchers' reputation are described. In the following description, for purposes of explanation, numerous specific details are set forth in order to provide a thorough understanding of example embodiments. It will be evident, however, to one skilled in the art that the embodiments of the present disclosure may be practiced without these specific details.

According to various example embodiments, a system is configured to improve search relevance of search results, based on the reputation of past searchers that have interacted with those search results. For example, in connection with a search for members of an online social networking service (such as LinkedIn®) having a particular skill posted on their member profile page, the skill expertise or skill reputation of past searchers that have interacted with such search results (during similar previous searches for members with that skill) may be taken into account. For example, if a searcher who is an expert or highly reputable with respect to the skill Java searches for members having the skill Java, and then clicks on the fourth listed member in the resulting list of search results (rather than the first through third listed members), then this signal from such a skill expert indicates that the fourth member may in fact be more relevant (in comparison to the other search results) in the context of such a search for members having the skill Java. Thus, the system may capture this behavior (e.g., in search relevance scores for each member in the search results), so that during a subsequent search, when another searcher (who may or may not be a Java skill expert) searches for members with the skill Java, the system will display the fourth member more prominently (e.g., higher) in the list of search results. Accordingly, by improving the relevance of search results, the system described herein efficiently provides searchers with more relevant results sooner, which reduces the need for further searching and browsing on the part of the searcher. This may result in a reduction in the processing power and network bandwidth demands placed on search engine hardware and software infrastructure.

Figure 1:
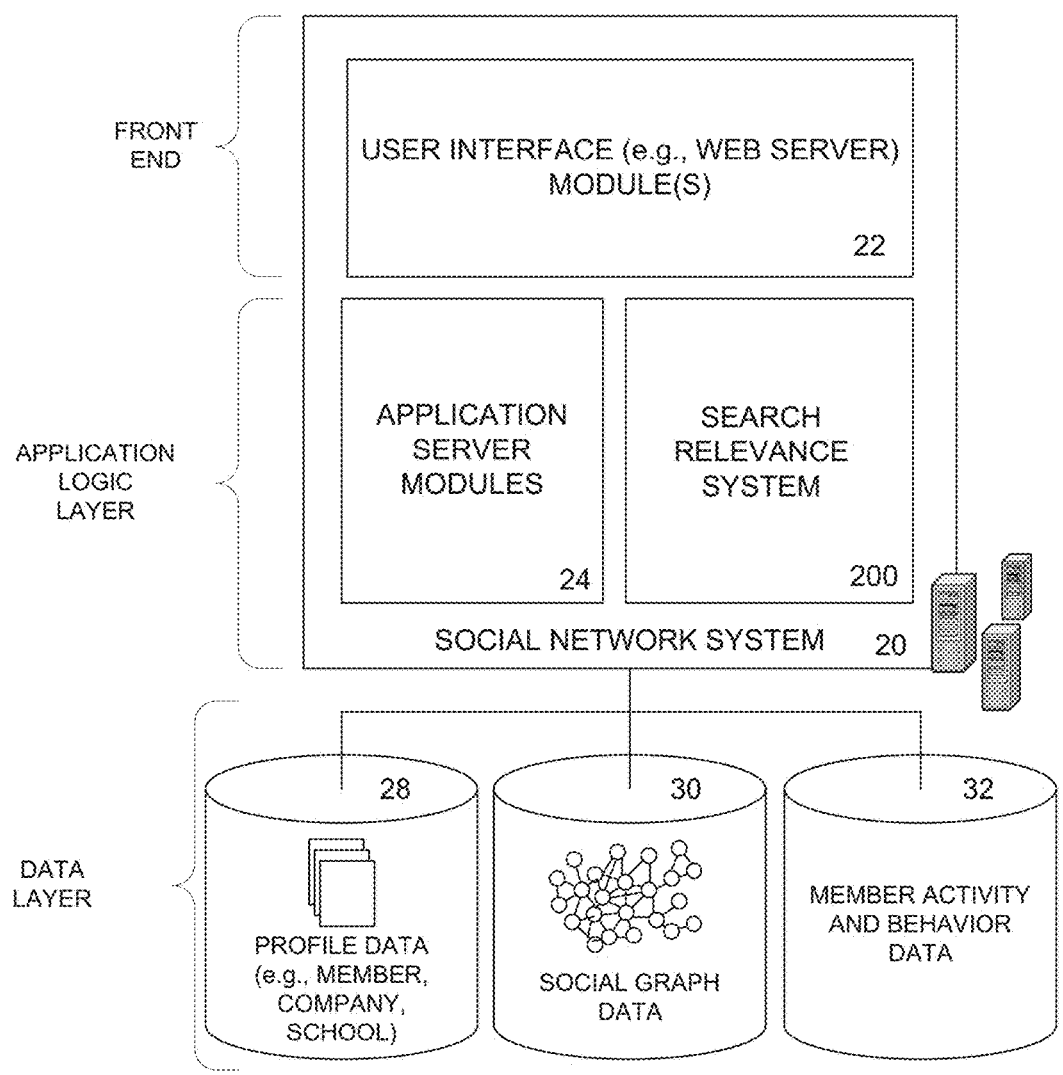
FIG. 1 is a block diagram showing the functional components of a social networking service, consistent with some embodiments of the present disclosure.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data tier various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as a search relevance system 200. The search relevance system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
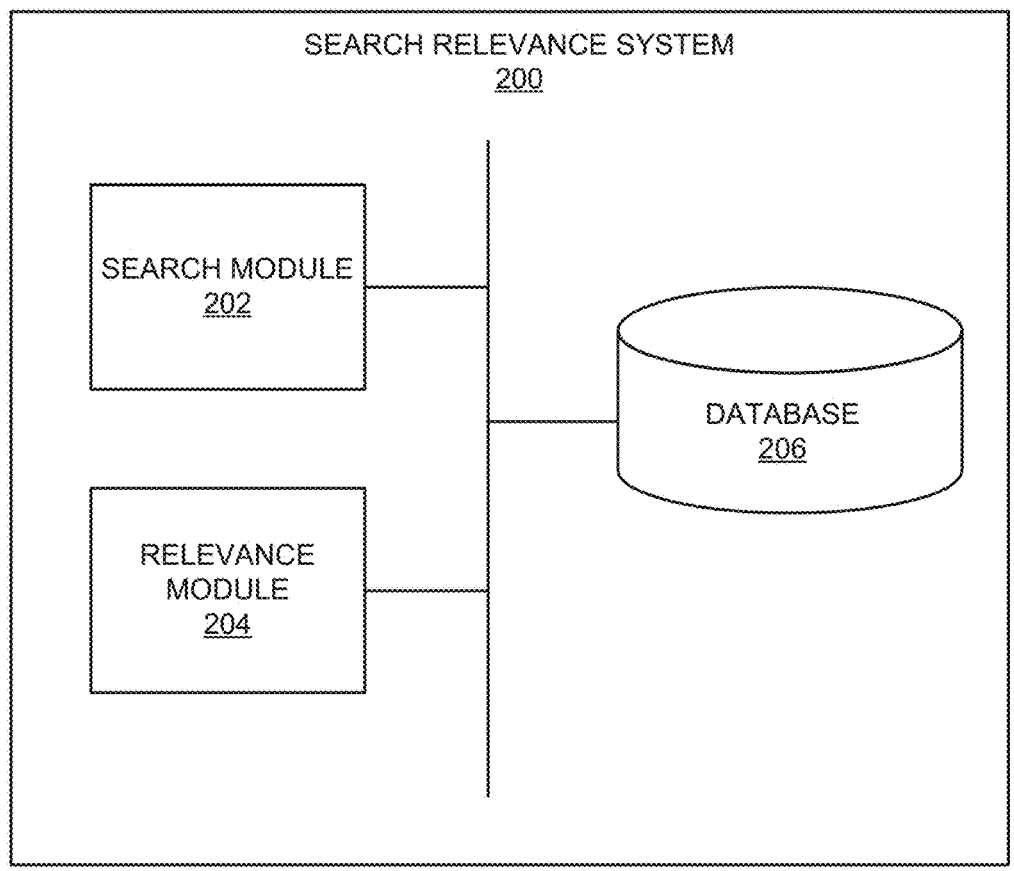
FIG. 2 is a block diagram of an example system, according to various embodiments.

Turning now to FIG. 2, a search relevance system 200 includes a search module 202, a relevance module 204, and a database 206. The modules of the search relevance system 200 may be implemented on or executed by a single device such as a search relevance device, or on separate devices interconnected via a network. The aforementioned search relevance device may be, for example, one or more client machines or application servers. The operation of each of the aforementioned modules of the search relevance system 200 will now be described in greater detail in conjunction with the various figures.

Figure 3:
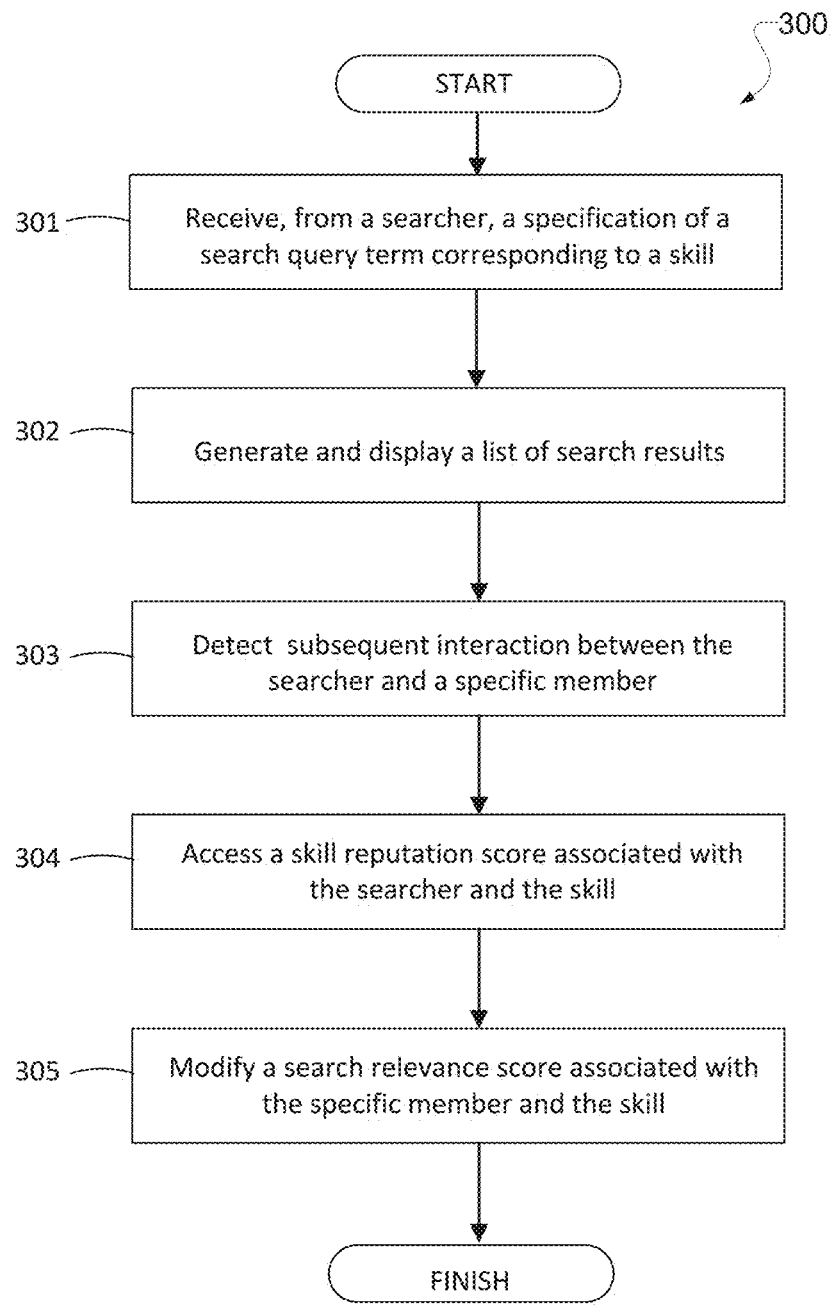
FIG. 3 is a flowchart illustrating an example method, according to various embodiments.

FIG. 3 is a flowchart illustrating an example method 300, consistent with various embodiments described herein. The method 300 may be performed at least in part by, for example, the search relevance system 200 illustrated in FIG. 2 (or an apparatus having similar modules, such as one or more client machines or application servers). In operation 301, the search module 202 receives, via one or more user interfaces, from a searcher, a specification of a search query term corresponding to a skill, in connection with a search for members of an online social networking service (e.g., LinkedIn®) having the skill. For example, the searcher may search for members having the skill of "HTML5" (e.g., by typing this skill into a member search user interface on an online social networking service). In operation 302, the search module 202 generates and displays a list of search results based on the search query term received in operation 301. Each of the search results correspond to a member of the online social networking service having the specified skill (e.g., where the specified skill is posted on their member profile page).

The search results may be generated based on preexisting skill relevance scores associated with each member of the online social networking service and the searched skill. Each search relevance score indicates a degree of relevance of a given member in connection with a search for members of the online social networking service having the skill. Thus, each member of the online social networking service may be associated with search relevance scores for each skill, such that John Smith may be associated with a search relevance score for the skill of "Java", a search relevance score for the skill of "HTML5", a search relevance score for the skill of "CSS", and so on. The search relevance system 200 may store such skill relevance scores for each member-skill pair in a database (e.g., database 206 in FIG. 2). Now, if a searcher searches for members having the skill of "HTML5", the search relevance system 200 may identify the top X members of the online social networking service with the highest appropriate "HTML5" search relevance scores, and those top X members may be displayed as search results.

Conventionally, such skill relevance scores are determined based on aggregate and generalized past behaviour of past searchers, without regard to the expertise or reputation of the searchers with respect to each skill. For example, if a search for members having the skill Java is performed, and search result member A receives 100 clicks whereas search result member B receives 5 clicks, then this behaviour may be captured in the search relevance scores for member A and member B with respect to this skill. For example, the search relevance score for the member:skill pair of [A:Java] may be increased over the search relevance score for the member:skill pair of [B:Java]. In this way, the next time a search is conducted for members having the skill Java, the modified search relevance scores for the member:skill pair [A:Java] and member:skill pair [B:Java] may be utilized, so that member A will appear higher in the search results than member B.

Referring back to FIG. 3, in operation 303, the relevance module 204 detects a subsequent interaction between the searcher and a specific member corresponding to one of the search results displayed in operation 302 (hereinafter referred to as the "selected member"). In some embodiments, the interaction between the searcher and the selected member corresponds to at least one of the searcher viewing the selected member's profile, viewing the selected member's profile for a predetermined time period, connecting with the selected member, and sending a message to the selected member. For example, the searcher may click on the search result corresponding to the selected member, and the search relevance system 200 may display the member profile page of the selected member, and the searcher may message the selected member or connect with the selected member based on links provided on the selected member's profile page. Alternatively, the search result may itself include links to view the selected member's profile, connect with the selected member, message the selected member, and so on. The messages described herein may be any type of electronic message, including an e-mail, text message (e.g., a short messaging service (SMS) message, a multimedia messaging service (MMS) message, etc.), an instant message associated with an online social network (e.g., Facebook®, LinkedIn®, Wechat®, WhatsApp®, etc.), a chat message associated with an online chat service, and so on. Other interactions are possible, such as posting information comment or recommendation) on the selected member's profile, endorsing the selected member for the skill, submitting social activity signals (e.g., likes, shares, comments, etc.) in connection with content posted by the selected member on their profile or in a feed, and so on.

In operation 304 in FIG. 3, the relevance module 204 accesses, from a database (e.g., database 206), a skill reputation score associated with the searcher and the searched skill (or a related skill, as described in more detail below). Such a skill reputation score indicates how reputable the searcher is with respect to that skill, or the searcher's expertise or authority with respect to that skill. Skill reputation scores are described in more detail below. In operation 305, the relevance module 204 modifies, based on the skill reputation score associated with the searcher and the skill (that was accessed in operation 304), a search relevance score associated with the specific member and the skill. As described above (e.g., in connection with operation 302), the search relevance score indicates a degree of relevance of the specific member in connection with the search for members of the online social networking service having the skill. In some embodiments, a higher skill reputation score associated with the searcher and the skill will result in a greater search relevance score associated with the specific member and the skill. Thus, the search relevance system 200 will change the search relevance score for a member:skill pair, based on the skill reputation of the searcher that interacted with the selected member. It is contemplated that the operations of method 300 may incorporate any of the other features disclosed herein. Various operations in the method 300 may be omitted or rearranged, as necessary.

Figure 4:
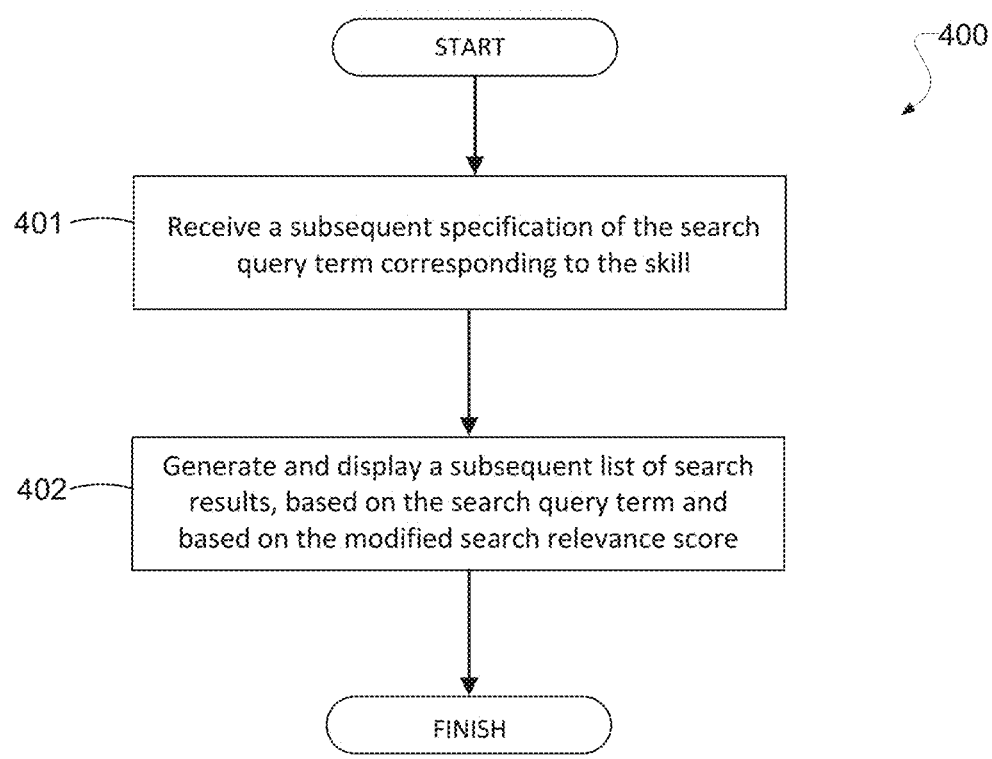
FIG. 4 is a flowchart illustrating an example method, according to various embodiments.

FIG. 4 is a flowchart illustrating an example method 400, consistent with various embodiments described herein. The method 400 may be performed after, for example, the method 300 in FIG. 3. The method 400 may be performed at least in part by, for example, the search relevance system 200 illustrated in FIG. 2 (or an apparatus having similar modules, such as one or more client machines or application servers). In operation 401, the search module 202 receives, via one or more user interfaces, a subsequent specification of a search query term corresponding to the same skill as that specified in operation 301, in connection with a subsequent search for members of the online social networking service having that same skill. In operation 402, the search module 202 generates and displays a subsequent list of search results, based on the search query term received in operation 401, and based on the modified search relevance score calculated in operation 305 that is associated with a given member and a skill. For example, the modified search relevance score may result in the given member appearing higher in the search results than would be the case with an unmodified search relevance score. It is contemplated that the operations of method 400 may incorporate any of the other features disclosed herein. Various operations in the method 400 may be omitted or rearranged, as necessary.

The relevance module 204 may modify the search relevance score of a selected member based on the skill reputation score of the searcher in various ways. For example, in some embodiments, the relevance module 204 may classify the searcher as an expert or highly reputable for a skill (also referred to herein as a "skill expert"), if their skill reputation score for the skill is greater than a predetermined threshold, or if they have one of the top X skill reputation scores for the skill among members of the online social networking service. If the searcher is indeed classified as a skill expert, then the relevance module 204 may proceed to modify the search relevance score of the selected member for the given skill. In contrast, if the searcher is not classified as a skill expert, the relevance module 204 may leave the search relevance score of the selected member for the given skill unaffected.

In some embodiments, the search relevance score is a raw number, or a number in a range (e.g., 0-100, 0-1, etc.). Accordingly, whenever a searcher is classified as a skill expert, the corresponding search relevance score for the selected member and the given skill may be increased (e.g., incremented by 1). In contrast, if the searcher is not a skill expert, the relevance module 204 may leave the search relevance score of the selected member for the given skill unaffected.

In other embodiments, interactions by both non-expert and expert searchers with a selected member may result in modifications to the search relevance score of the member, but the interactions by the skill expert may result in a greater modification than interactions by non-experts. For example, whenever a searcher is not classified as a skill expert, the corresponding search relevance score for the selected member and the given skill may be increased by a smaller amount, weight, factor, multiplier, etc, (e.g., incremented by 1). In contrast, if the searcher is classified as a skill expert, the corresponding search relevance score for the selected member and the given skill may be increased by a greater amount, weight, factor, multiplier, etc. (e.g., incremented by 10).

In some embodiments, the relevance module 204 may modify the search relevance score differently based on the type of the interaction. For example, viewing the member's profile may provide a limited indication of search relevance, viewing the member's profile for a predetermined/extended time period may provide a greater indication of search relevance, connecting with the member may provide an even greater indication of search relevance, and sending a message to the member may provide a still greater indication of search relevance. Thus, the stronger interaction signals may result in a greater degree of modification to the search relevance score than the weaker interaction signals. For example, viewing the member's profile may result in a smaller modification to the search relevance score, viewing the member's profile for a predetermined/extended time period may result in a larger modification to the search relevance score, connecting with the member may result in an even larger modification to the search relevance score, and sending a message to the member may result in a yet larger modification to the search relevance score. Moreover, note that for each type of interaction, the degree of modification to the selected member's search relevance score due to interaction with a skill expert will be greater than the degree of modification (if any) to the selected member's search relevance score due to interaction with a non-expert.

In some embodiments, the relevance module 204 may utilize a tiered threshold approach to handle skill reputation scores. For example, if the skill reputation score of the searcher is greater than a first threshold, the search relevance score of the selected member may be increased by a greater amount, weight, factor, multiplier, etc, (e.g., incremented by 10), whereas if the skill reputation score of the searcher is less than the first threshold but greater than a smaller second threshold, the search relevance score of the selected member may be increased by a smaller amount, weight, factor, multiplier, etc. (e.g., incremented by 5), whereas if the skill reputation score of the searcher is less than the second threshold but greater than an even smaller third threshold, the search relevance score of the selected member may be increased by an even smaller amount, weight, factor, multiplier, etc. (e.g., incremented by 5), and so on.

In some embodiments, the relevance module 204 may simply always modify the search relevance score of the selected member for the given skill in a consistent manner, such as by multiplying the search relevance score of the selected member by the skill reputation score of the searcher.

In some embodiments, the relevance module 204 may generate the skill reputation score itself that is associated with the searcher and the skill, based on a number of endorsements the searcher has received for the skill via the online social networking service (e.g., the greater the number of endorsements for the skill, the greater the member's skill reputation score). In some embodiments, the relevance module 204 may generate the skill reputation score based on information on the member's profile (e.g., recommendations or comments that mention the skill, articles that mention the skill, job titles or descriptions that mention the skill, education credentials or descriptions that mention the skill, etc., where the greater the number of aforementioned mentions of the skill, the greater the member's skill reputation score). The relevance module 204 may generate skill reputation scores using any techniques described in pending U.S. patent application Ser. No. 13/852,262, filed Mar. 28, 2013, and pending U.S. patent application Ser. No. 14/675,668, filed Mar. 31, 2015, both of which are incorporated herein by reference.

As described above, the relevance module 204 may modify a search relevance score associated with a selected member and a skill, where the search relevance score indicates a degree of relevance of the specific member in connection with a search for members having the skill. In some embodiments, the relevance module 204 may modify the skill reputation score (in contrast to the search relevance score) associated with the selected member and the skill, based on the detected interaction. In this way, when the selected member themselves performs a subsequent search for other members having the skill, the modified skill reputation score will be use to adjust the search relevance scores for whatever other members in the search results that they interact with.

In the examples described above, the skill that the searcher searches for (e.g., "Java") matches the skill that the searcher is an expert on, in order for the search relevance score for the selected member and that same skill to be adjusted. In other embodiments, the skills need not be identical, but may be related. For example, suppose a searcher is highly reputable in the skill of "computer programming", and searches for members having the skill "HTML5". The search relevance scores associated with the selected member and the skills "computer programming" and/or "HTML5" may be modified, since the skill of computer programming may be related to the skill of HTML5. For example, the database 206 may store related skill information 500 in FIG. 5 indicating clusters, groups, or sets of related skills. Thus, if a searcher is highly reputable in a skill A in skill cluster 1, and searches for members having skill B in cluster 1, then the search relevance scores associated with the selected member and the skills A and/or B may be modified, since the skills A and B are included in the same cluster 1 and are thus related.

In some embodiments, the skills in a given cluster may simply correspond to alternative names or even common misspellings for the same skill (e.g., computer science, computer sciences), rather than distinct but related skills (e.g., "HTML", "HTML5"). The related skills information may be generated by the search relevance system 200 in various ways, including examining member profile data of members and determining that if a significant number or proportion (e.g., in comparison to a predetermined threshold) of the members that have skill A also have skill B, and vice versa, then skill A is related to skill B and they are placed in a given cluster.

In some embodiments, the related skill information may be stored in the form of a data tree or hierarchy, where a given skill (e.g., computer programming) may correspond to a parent node and may have related subskills or child nodes (e.g., Java, C++, HTML), and each of these child nodes (e.g., HTML) may have further child nodes (e.g., HTML 4, HTML5, etc.). Thus, if a searcher is highly reputable in a skill A, and searches for members having skill B that is a parent/child node of skill A in the data tree, then the search relevance scores associated with the selected member and the skills A and/or B may be modified, since the skills A and B are related. Examples of a skills data tree and/or skills hierarchy are described in pending U.S. patent application Ser. No. 14/296,258, filed Jun. 4, 2014, which is incorporated herein by reference.

In some embodiments, the specialization of skills may be represented by their position in the data tree, where a parent node (e.g., computer programming) is less specialized, and child nodes (e.g., HTML 4, HTML5, etc.) are more specialized. This information may be used to adjust how the reputation score for the searcher modifies the search relevance score for the selected member. For example, if the searcher is highly reputable with respect to a specialized skill (e.g., HTML5, etc.), this may have a greater impact on the search relevance score for the selected member, than if the searcher is highly reputable with respect to a general skill (e.g., computer programming). For example, the system may apply a greater weight, modifier, or multiplication factor for specialized skills than for generalized skills, and this weighted skill reputation score may be utilized for modifying the search relevance score of the selected member. In other embodiments, the skill relevance score itself may take into account the specialization of the skill. For example, if someone is reputable for a specialized skill like HTML5, they may have a higher skill relevance score of 0.9, in comparison to someone who is equally reputable for a less specialized skill like computer programmer, who may have a lower skill relevance score like 0.7.

In some embodiments, the specialization of the skill may be determined based on the size of community with that skill. For example, the search relevance system 200 may determine the number of members of the online social networking service with a given skill, and this may be used to adjust skill reputation scores for that skill. For example, suppose a first person is reputable for a skill like HTML5 and has a skill reputation score of 0.8, and a second person is reputable for a skill like computer programming and also has a skill reputation score of 0.8. The search relevance system 200 may determine that few members of the online social networking service have the skill HTML5, and thus increase the skill reputation score for the first person from 0.8 to 0.9 to reflect the specialization of this skill. On the other hand, the search relevance system 200 may determine that far more members of the online social networking service have the skill computer programming, and thus reduce the skill reputation score for the second person from 0.8 to 0.7 (or leave it unchanged) to reflect the unspecialized nature of this skill.

Various examples described herein refer to a search query with a single search query term corresponding to a skill. For example, if a searcher John Smith searches for members based on the single search query term of the skill "HTML", then the reputation of the searcher John Smith with respect to the skill of HTML (e.g., as represented by a skill reputation score such as 0.99) may impact the search relevance score associated with a search result member Jane Doe (selected by John Smith) and the skill HTML. The techniques described herein may also be applied in cases where the searcher inputs a search query with more than one skills term. For example, suppose the searcher John Smith searches for a member using multiple skills terms, such as by entering the search query "HTML+Java+CSS". The searcher John Smith may have varying degrees of reputation for different skills (e.g., as represented by skill reputation scores of 0.99 for HTML, 0.5 for Java, and 0.2 for CSS). Accordingly, the searcher John Smith's reputation for each skill may impact the appropriate search relevance score for the selected member Jane Doe and that respective skill, consistent with the embodiments described herein. For example, the searcher John Smith's skill reputation score of 0.99 for HTML may impact Jane Doe's search relevance score for the skill of HTML, while the searcher John Smith's skill reputation score of 0.5 for Java may impact Jane Doe's search relevance score for the skill of Java, and the searcher John Smith's skill reputation score of 0.2 for CSS may impact Jane Doe's search relevance score for the skill of CSS, consistent with the embodiments described herein. In some embodiments, the aforementioned processing is only applied to skills terms in the search query, and not to any non-skills terms in the search query (e.g., locations, job titles, companies, etc.). For example, the system 200 may analyze all the query terms in the search query, identify all the query terms that correspond to skills (such as by comparing each query term against a list of known skills terms), and disregard any remaining, non-matched query terms in the search query.

In various embodiments described herein, a searcher who is reputable for a given skill searches for members of the online social network service having that skill. In other embodiments, the searcher may search for other entities that may be associated with skills, such as jobs, companies, or groups, and the search relevance scores for these entities in the context of a search for entities being associated with the given skill), may be adjusted consistent with the techniques described herein. For example, suppose a searcher who is an expert on Java performs a search for jobs associated with or requiring the skill of Java (e.g., by entering this skill into a job search engine), and clicks on the $4^{th}$ job result. This may indicate that this $4^{th}$ result is highly relevant in the context of such a search. Thus, the system may capture this behavior by modifying the search relevance score for that job:skill pair, so that during a subsequent search, when another searcher (who may or may not be reputable with respect to the skill Java) searches for jobs requiring the skill Java, the system will display the fourth job higher in the list of search results.

Moreover, in some embodiments, the searcher may search for a job title rather than a skill. In this case, if the relevance module 204 determines that the given job title is in fact associated with a skill, similar techniques can be applied above. For example, suppose a searcher who is an expert on Java performs a search for jobs associated with the title "computer programmer", and clicks on the $4^{th}$ job result. The relevance module 204 may determine that the job title "computer programmer" is associated with various skills, including the skill Java that the searcher is an expert on. This may indicate that this $4^{th}$ result is highly relevant in the context of such as search. Thus, the system may capture this behavior by modifying the search relevance score for that job:title pair, so that during a subsequent search, when another searcher (who may or may not be reputable with respect to the skill Java) searches for jobs with the job title "computer programmer", the system will display the fourth job higher in the list of search results. The relevance module 204 may determine that a given job title is in fact associated with a skill, based on a list of required/preferred skills included in the job listing, or by accessing job title-skill mapping information that indicates a mapping of job titles to associated skills. The relevance module 204 may generate such job title-skill mapping information by examining member profile data of members and determining that if a significant number or proportion (e.g., in comparison to a predetermined threshold) of the members that have job title A also have skill B, and vice versa, then job title A should be mapped to skill B.

Example Mobile Device

Figure 6:
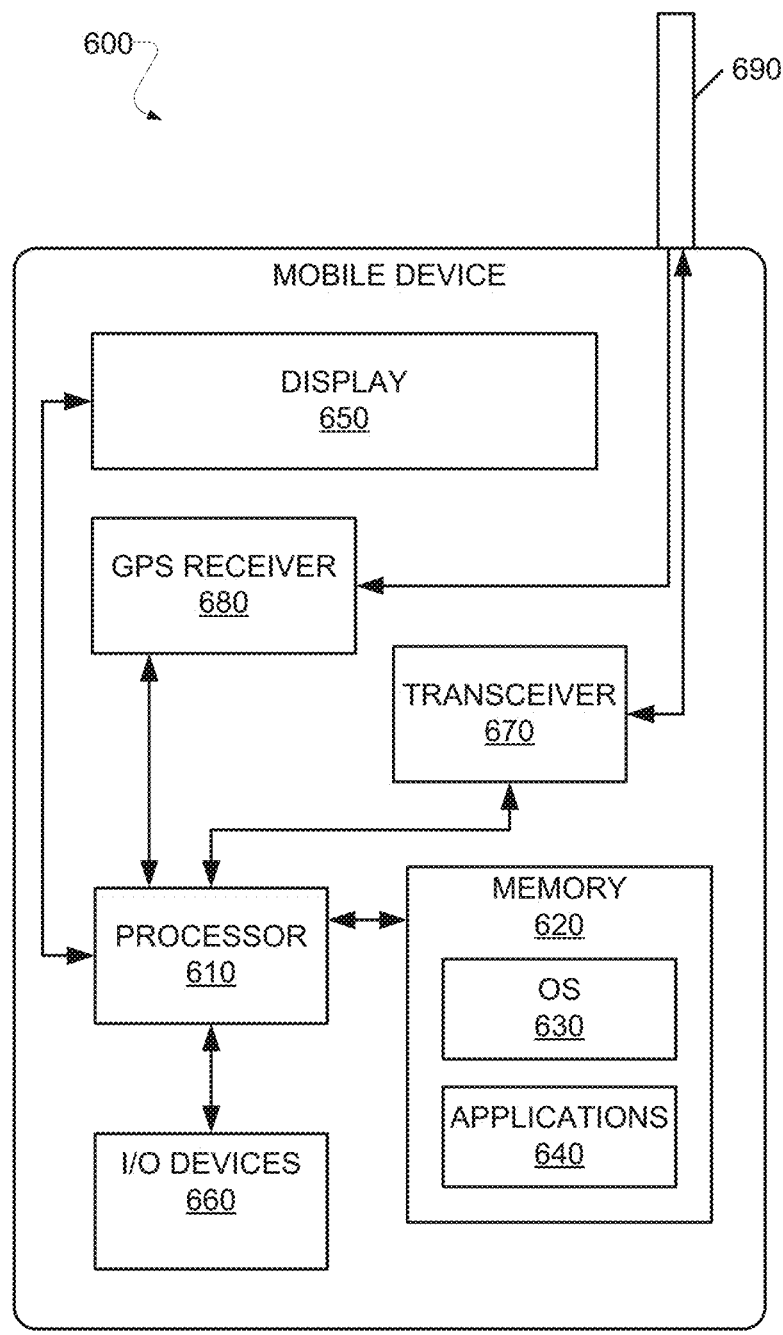
FIG. 6 illustrates an example mobile device, according to various embodiments.

FIG. 6 is a block diagram illustrating the mobile device 600, according to an example embodiment. The mobile device may correspond to, for example, one or more client machines or application servers. One or more of the modules of the system 200 illustrated in FIG. 2 may be implemented on or executed by the mobile device 600. The mobile device 600 may include a processor 610. The processor 610 may be any of a variety of different types of commercially available processors suitable for mobile devices (for example, an XScale architecture microprocessor, a Microprocessor without Interlocked Pipeline Stages (MIPS) architecture processor, or another type of processor). A memory 620, such as a Random Access Memory (RAM), a Flash memory, or other type of memory, is typically accessible to the processor 610. The memory 620 may be adapted to store an operating system (OS) 630, as well as application programs 640, such as a mobile location enabled application that may provide location based services to a user. The processor 610 may be coupled, either directly or via appropriate intermediary hardware, to a display 650 and to one or more input/output (I/O) devices 660, such as a keypad, a touch panel sensor, a microphone, and the like. Similarly, in some embodiments, the processor 610 may be coupled to a transceiver 670 that interfaces with an antenna 690. The transceiver 670 may be configured to both transmit and receive cellular network signals, wireless data signals, or other types of signals via the antenna 690, depending on the nature of the mobile device 600. Further, in some configurations, a GPS receiver 680 may also make use of the antenna 690 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations, it will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
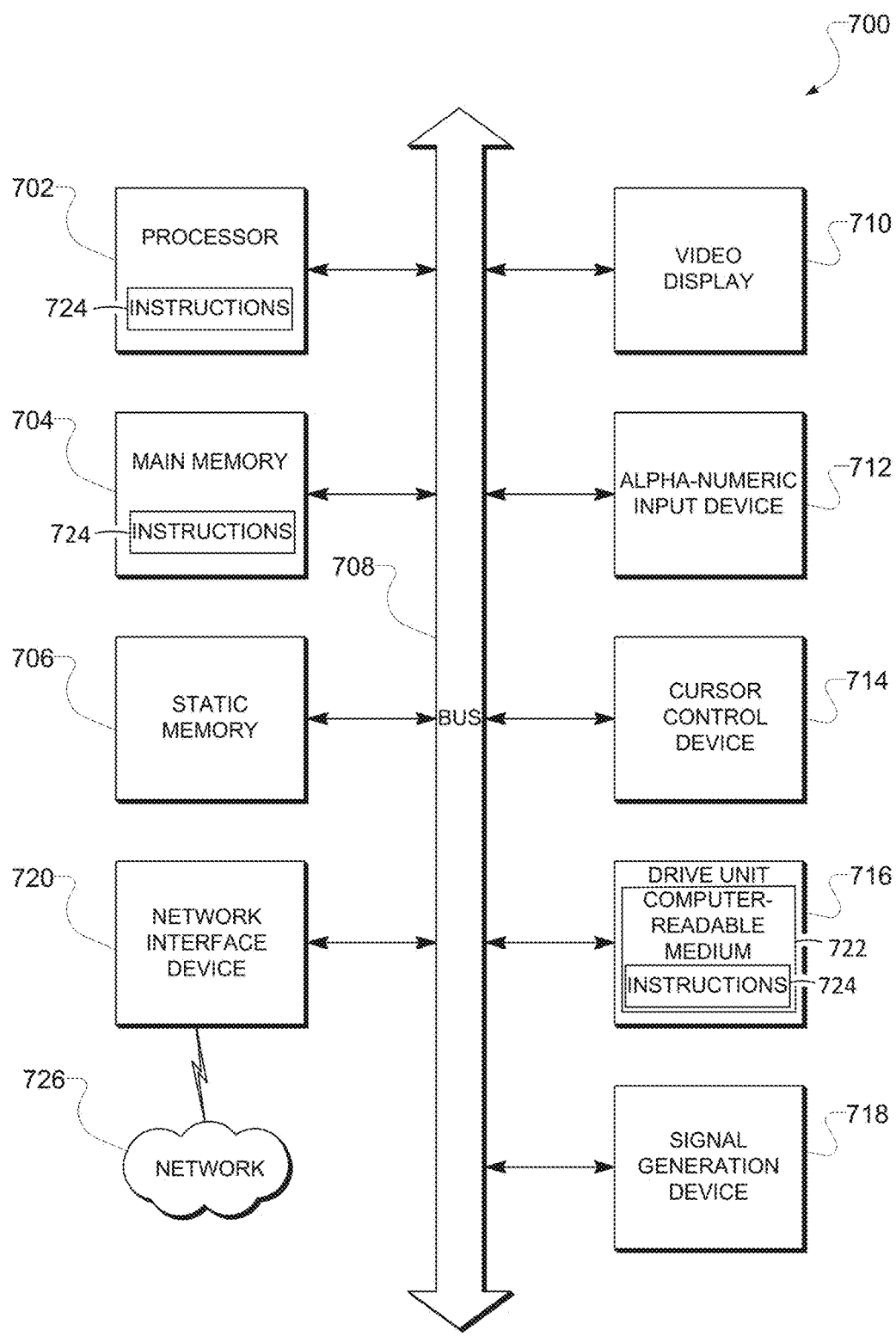
FIG. 7 is a diagrammatic representation of a machine in the example form of a computer system within which a set of instructions, for causing the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (CPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall a so be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiWAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   receiving, via one or more user interfaces, from a searcher, a search query term corresponding to a skill, in connection with a search for member profiles in an online social networking service, wherein a database stores a skill reputation score indicating familiarity of the searcher with the skill;
   generating and displaying search results based on the search query term corresponding to the skill, each item in the search results is a reference to a respective member profile in the online social networking service;
   detecting an interaction of the searcher with a reference to a member profile in the search results, the member profile is associated with a search relevance score with respect to the skill, a position of the reference to the member profile in the displayed search results determined based on search relevance score;
   in response to the detecting of the interaction:
      accessing, from the database, the skill reputation score indicating familiarity of the searcher with the skill, and
      modifying the search relevance score of the member profile with respect to the skill based on the skill reputation score, wherein a greater skill reputation score associated with the searcher and the skill results in a greater search relevance score associated with the member profile and the skill;
   receiving, via the one or more user interfaces, a subsequent search query term corresponding to the skill, in connection with a subsequent search for member profiles in the online social networking service; and
   generating and displaying a subsequent list of search results, based on the subsequent search query term and based on the modified search relevance score associated with the member profile and the skill.

2. The method of claim 1, wherein the generating and displaying of the search results that include the item is performed based on an unmodified version of the search relevance score.

3. The method of claim 1, wherein the interaction corresponds to at least one of the searcher viewing the member profile for a predetermined time period, connecting with a member represented by the member profile, and sending a message to a member represented by the member profile.

4. The method of claim 1, further comprising modifying the search relevance score associated with the member profile and the skill, based on a type of the interaction.

5. The method of claim 4, wherein a first type of interaction results in a greater degree of modification to the search relevance score than a second type of interaction.

6. The method of claim 1, further comprising generating the skill reputation score associated with the searcher and the skill, based on a number of endorsements the searcher has received for the skill via the online social networking service.

7. The method of claim 1, further comprising modifying a skill reputation score associated with the member profile and the skill, based on the detected interaction.

8. A system comprising:
   a processor;
   a memory device holding an instruction set executable on the processor to cause the system to perform operations comprising:
      receiving, via one or more user interfaces, from a searcher, a search query term corresponding to a skill, in connection with a search for member profiles in an online social networking service, wherein a database stores a skill reputation score indicating familiarity of the searcher with the skill;
      generating and displaying search results based on the search query term corresponding to the skill, each item in the search results is a reference to a respective member profile in the online social networking service;
      detecting an interaction of the searcher with a reference to a member profile in the search results, the member profile is associated with a search relevance score with respect to the skill, a position of the reference to the member profile in the displayed search results determined based on search relevance score;
      in response to the detecting of the interaction:
         accessing, from the database, the skill reputation score indicating familiarity of the searcher with the skill, and
         modifying the search relevance score of the member profile with respect to the skill based on the skill reputation score, wherein a greater skill reputation score associated with the searcher and the skill results in a greater search relevance score associated with the member profile and the skill;
      receiving, via the one or more user interfaces, a subsequent search query term corresponding to the skill, in connection with a subsequent search for member profiles in the online social networking service; and
      generating and displaying a subsequent list of search results, based on the subsequent search query term and based on the modified search relevance score associated with the member profile and the skill.

9. The system of claim 8, wherein the generating and displaying of the search results that include the item is performed based on an unmodified version of the search relevance score.

10. The system of claim 8, wherein the interaction corresponds to at least one of the searcher viewing the member profile, viewing the member profile for a predetermined time period, connecting with a member represented by the member profile, and sending a message to a member represented by the member profile.

11. The system of claim 8, wherein the operations further comprise modifying the search relevance score associated with the member profile and the skill, based on the type of the interaction.

12. A non-transitory machine-readable storage medium comprising instructions that, when executed by one or more processors of a machine, cause the machine to perform operations comprising:
- receiving, via one or more user interfaces, from a searcher, a search query term corresponding to a skill, in connection with a search for member profiles in an online social networking service, wherein a database stores a skill reputation score indicating familiarity of the searcher with the skill;
- generating and displaying search results based on the search query term corresponding to the skill, each item in the search results is a reference to a respective member profile in the online social networking service;
- detecting an interaction of the searcher with a reference to a member profile in the search results, the member profile is associated with a search relevance score with respect to the skill, a position of the reference to the member profile in the displayed search results determined based on search relevance score;
- in response to the detecting of the interaction:
  - accessing, from the database, the skill reputation score indicating familiarity of the searcher with the skill, and
- modifying the search relevance score of the member profile with respect to the skill based on the skill reputation score, wherein a greater skill reputation score associated with the searcher and the skill results in a greater search relevance score associated with the member profile and the skill;
- receiving, via the one or more user interfaces, a subsequent search query term corresponding to the skill, in connection with a subsequent search for member profiles in the online social networking service; and
- generating and displaying a subsequent list of search results, based on the subsequent search query term and based on the modified search relevance score associated with the member profile and the skill.

13. The storage medium of claim 12, wherein the generating and displaying of the search results that include the item is performed based on an unmodified version of the search relevance score.

14. The storage medium of claim 12, wherein the operations further comprise:
- receiving, via the one or more user interfaces, a subsequent specification of the search query term corresponding to the skill, in connection with a subsequent search for member profiles in the online social networking service; and
- generating and displaying a subsequent list of search results, based on the search query term and based on the modified search relevance score associated with the member profile and the skill.

15. The storage medium of claim 12, wherein the interaction corresponds to at least one of the searcher viewing the member profile, viewing the member profile for a predetermined time period, connecting with a member represented by the member profile, and sending a message to the member represented by the member profile.

* * * * *